United States Patent [19]

Nathan et al.

[11] Patent Number: 4,725,368

[45] Date of Patent: Feb. 16, 1988

[54] PROCESS FOR THE PREPARATION OF SUBSTANTIALLY CRYSTALLINE CALCIUM SODIUM METAPHOSPHATE

[75] Inventors: Vaidy R. Nathan, St. Louis; Alan W. Seder, Manchester; James E. Downes, St. Louis, all of Mo.

[73] Assignee: Monsanto Company, St. Louis, Mo.

[21] Appl. No.: 924,672

[22] Filed: Nov. 5, 1986

Related U.S. Application Data

[63] Continuation-in-part of Ser. No. 812,043, Dec. 23, 1985, abandoned.

[51] Int. Cl.$^4$ .............................................. C01B 25/30
[52] U.S. Cl. ........................................ 252/1; 423/306
[58] Field of Search ..................... 423/306, 314; 252/1

[56] References Cited

FOREIGN PATENT DOCUMENTS 1122610 11/1984 U.S.S.R. ............................... 423/314

Primary Examiner—John Doll
Assistant Examiner—Wayne A. Langel
Attorney, Agent, or Firm—Wendell W. Brooks; Arthur E. Hoffman; Arnold H. Cole

[57] ABSTRACT

Substantially crystalline calcium sodium metaphosphate having a degree of crystallinity from about 60% to about 75% as determined from density and differential thermal analysis measurements is prepared by (a) forming a dry mixture of source materials for CaO, Na$_2$O, and P$_2$O$_5$ in proportions sufficient to provide a CaO/Na$_2$O/P$_2$O$_5$ mol percent ratio on a dry basis of about 29.0–34.0/16.0–18.0/50.0–53.0 and (b) heating the mixture at a temperature and for a time sufficient devolatilize the mixture and calcine the resulting mixture to form the substantially crystalline calcium soldium metaphosphate.

12 Claims, No Drawings

PROCESS FOR THE PREPARATION OF SUBSTANTIALLY CRYSTALLINE CALCIUM SODIUM METAPHOSPHATE

CROSS-REFERENCE TO RELATED APPLICATIONS

This application is a continuation-in-part of copending application Ser. No. 812,043, filed Dec. 23, 1985, now abandoned.

BACKGROUND OF THE INVENTION

1. Field of the Invention

This invention relates to a process for the preparation of substantially crystalline calcium sodium metaphosphate. More particularly, this invention relates to a dry mix process for the preparation of substantially crystalline calcium sodium metaphosphate. Such substantially crystalline calcium sodium metaphosphate is useful to prepare asbestiform crystalline calcium sodium metaphosphate fibers which are characterized by having the form or appearance of asbestos (principally chrysotile) and by exhibiting an aspect ratio of at least 10, preferably at least 50, and an average in diameter from about 0.5 micron ($\mu$m) to about 20 $\mu$m.

2. Discussion of the Prior Art

Calcium sodium metaphosphate having the formula $CaNa(PO_3)_3$ is known, primarily identified as the completely crystalline form. In Russian Pat. No. 1,122,610, a method is described for the preparation of crystalline calcium sodium metaphosphate (referred to therein as sodium-calcium metaphosphate). The process consists of interacting phosphoric acid at a concentration of 30-56% $P_2O_5$ in an amount sufficient to provide a 5-15% excess over the stoichiometrically required amount first with a calcium compound, followed by a sodium compound. The resulting reaction mixture is heated at a temperature from 350°-500° C. However, it generally has not been feasible to employ such a procedure to prepare substantially crystalline calcium sodium metaphosphate containing up to about 40% amorphous calcium sodium metaphosphate. One reason for this difficulty stems from the fact that the Russian procedure employs a two-step neutralization or reaction scheme, one to neutralize or react with the calcium compound and the other to neutralize or react with the sodium compound.

The procedural requirements associated with the employment of a two-step neutralization or reaction scheme, of necessity, are time-consuming and inconvenient. Accordingly, any economically feasible method which substantially reduces the time and number of steps involved in the reaction scheme, while at the same time affording an excellent yield of product, would be a decided advance in the calcium sodium metaphosphate art.

SUMMARY OF THE INVENTION

It is an object of this invention to provide a process for the preparation of substantially crystalline calcium sodium metaphosphate.

To achieve this and other objects, together with the advantages thereof, which will become apparent from the accompanying description and claims, a process is provided for the preparation of substantially crystalline calcium sodium metaphosphate having a degree of crystallinity from about 60% to 75% as determined from density and differential thermal analysis measurements, which process comprises:

(a) forming a dry mix mixture of source materials for CaO, $Na_2O$, and $P_2O_5$ in proportions sufficient to provide a $CaO/-Na_2O/P_2O_5$ mol percent ratio on a dry basis of about 29.0-34.0/16.0-18.0/50.0-53.0, and (b) heating the mixture from step (a) at a temperature and for a time sufficient to volatilize and remove volatile components and calcine the resulting mixture to form the substantially crystalline calcium sodium metaphosphate.

DESCRIPTION OF THE PREFERRED EMBODIMENTS

In accordance with this invention, a process is provided for the preparation of substantially crystalline calcium sodium metaphosphate which is useful to prepare asbestiform crystalline calcium sodium metaphosphate fibers. The substantially crystalline calcium sodium metaphosphate is prepared by a process which comprises:

(a) forming a dry mix mixture of source materials for CaO, $Na_2O$, and $P_2O_5$ in proportions sufficient to provide a $CaO/Na_2O/P_2O_5$ mol percent ratio on a dry basis of about 29.0-34.0/16.0-18.0/-50.0-53.0, and (b) heating the dry mix mixture at a temperature and for a time sufficient to volatilize and remove volatile components and calcine the resulting mixture to form the substantially crystalline calcium sodium metaphosphate.

The term "substantially crystalline" is employed herein to describe calcium sodium metaphosphate having a degree of crystallinity (DC) between about 60% and about 75%. The degree of crystallinity may be calculated from density measurements by Equation (1)

$$DC=[(d_{sc}-d_{Oc})/d_{100c}-d_{Oc})]\times 100 \qquad (1)$$

wherein:

$d_{sc}$ is the density of the substantially crystalline calcium sodium metaphosphate at 23° C.;

$d_{Oc}$ is the density of amorphous (DC=0%) calcium sodium metaphosphate; and $d_{100c}$ is the density of crystalline (DC=100%) calcium sodium metaphosphate at 23° C. The value of $d_{100c}$ may be calculated from the crystal type and crystal lattice parameters obtained from wide angle X-ray diffraction measurements. The value of $d_{Oc}$ may be obtained via density measurements on samples exhibiting no apparent degree of crystallinity by X-ray diffraction or differential scanning calorimetric measurements.

Alternatively, DC may be calculated from the differential thermal analysis (DTA) peak area of a substantially crystalline calcium sodium metaphosphate sample at 749° C., the melting point of crystalline calcium sodium metaphosphate, relative to that of a crystalline (DC=100%) calcium sodium metaphosphate sample as a reference material by Equation (2)

$$DC=[(pa_{sc}/m_{sc})/(pa_{100c}/m_{100c})]\times 100 \qquad (2)$$

wherein:

$pa_{sc}$ is the DTA peak area of the substantially crystalline calcium sodium metaphosphate sample at 749° C., the melting point of crystalline (DC=100%) calcium sodium metaphosphate;

$m_{sc}$ is the mass or weight of the substantially crystalline calcium sodium metaphosphate sample;

$pa_{100c}$ is the DTA peak area of the crystalline calcium sodium metaphosphate reference sample; and $m_{100c}$ is the mass or weight of the crystalline calcium sodium metaphosphate sample.

The substantially crystalline calcium sodium metaphosphate prepared in accordance with the instant process preferably is that which is readily convertible into asbestiform crystalline calcium sodium metaphosphate fibers. Referring to the substantially crystalline calcium sodium metaphosphate in terms of its dry basis calcium oxide (CaO)/sodium oxide ($Na_2O$)/phosphorus pentoxide ($P_2O_5$) composition equivalent, a mol percent ratio from about 29.0 to about 34.0 CaO, from about 16.0 to about 18.0 $Na_2O$, and from about 50.0 to about 53.0 $P_2O_5$, that is, a CaO/$Na_2O$/$P_2O_5$ mol percent ratio of about 29.0–34.0/16.0–18.0/–50.0–53.0, has been found to consistently provide a superior product for the contemplated end-use applications. It is preferred to provide substantially crystalline calcium sodium metaphosphate having the composition on a dry basis equivalent to a CaO/$Na_2O$/$P_2O_5$ mol percent ratio of about 31.4–31.8/17.1–17.3/51.1–51.3, with a CaO/$Na_2O$/$P_2O_5$ mol percent ratio of about 31.6/17.2/51.2 being most preferred.

The substantially crystalline calcium sodium metaphosphate can be prepared from any number of component source materials known to those skilled in the art so long as the stated CaO/$Na_2O$/$P_2O_5$ mol percent ratio is achieved. It is preferred, by virtue of the elemental composition of the substantially crystalline calcium sodium metaphosphate to minimize the presence of anions other than carbonates, hydroxides, and phosphates, since the presence of more than trace amounts of anions such as sulfates, halides, and the like tends to exert an adverse effect upon the desired product. For convenience, the component source materials will be referred to herein as source materials for CaO, $Na_2O$, and $P_2O_5$.

Suitable source materials for CaO include calcium phosphates and basic calcium-containing materials such as calcium carbonate, calcium oxide, calcium hydroxide, and mixtures thereof. Calcium phosphates, especially monobasic calcium orthophosphate [Ca($H_2PO_4$)$_2$], are generally preferred in that they are readily available, can be easily mixed with other source materials, and do not introduce any extraneous anions into the product.

Compounds suitable for use as the source material for $Na_2O$ include the sodium orthophosphates and condensed phosphates which contain at least one P-O-P linkage such as the metaphosphates and the like, sodium hydroxide, sodium carbonate, and the like. For reasons similar to those stated for the preference for calcium phosphates as the CaO source material, sodium orthophosphates, especially sodium dihydrogen phosphate ($NaH_2PO_4$), are preferred as the $Na_2O$ source material. Advantages accruing from the use of sodium orthophosphates as the $Na_2O$ source material include their ready availability, their ease of mixing with other source materials, and little, if any, undesirable foam formation during mixing operations.

Representative source materials for $P_2O_5$ include phosphorus pentoxide, orthophosphoric acid, and orthophosphate salts such as sodium dihydrogen orthophosphate, disodium hydrogen orthophosphate, trisodium orthophosphate, condensed phosphoric acids such as pyrophosphoric acids and polyphosphoric acids, and the sodium salts of condensed phosphoric acid. Among these materials, orthophosphoric acid ($H_3PO_4$) is preferred, with 85% $H_3PO_4$ being most preferred.

The purity of the source materials for CaO, $Na_2O$, and $P_2O_5$ must be such that the yield of substantially crystalline calcium sodium metaphosphate is not affected adversely. Advantageously, it is preferred to use reagent grade materials to control the level of undesired impurities such as iron, silica, alumina, and the like.

The substantially crystalline calcium sodium metaphosphate is prepared by bringing together the source materials for CaO, $Na_2O$, and $P_2O_5$ in proportions sufficient to provide a CaO/$Na_2O$/$P_2O_5$ mol percent ratio on a dry basis of about 29.0–34.0/16.0–18.0/50.0–53.0. The component source materials are mixed by blending in the substantially dry state, i.e., dry mixed.

Following the formation of the CaO/$Na_2O$/$P_2O_5$ dry mix mixture, volatile components, primarily residual water, are removed and the resulting mixture calcined to yield the desired (calcined) substantially crystalline calcium sodium metaphosphate (conveniently referred to herein simply as substantially crystalline calcium sodium metaphosphate).

The devolatilization and calcination operations may be effected in any suitable apparatus known to the art. Non-limiting examples include ovens or muffle furnaces containing fixed beds or moving beds, rotary kilns, and the like.

Removal of volatile components, for example, residual water, from the dry mix mixture can take the form of a simple heating process in which the mixture is subjected to a temperature that is sufficiently high to volatilize or vaporize the volatile component(s) and remove it (them) from the mixture.

In general, devolatilization may be accomplished by heating the dry mix mixture at subatmospheric or atmospheric pressures at a temperature in excess of ambient temperature for example, from about 60° C. up to about 200° C., usually from about 100° C. to about 150° C., for a period of time up to about eight hours, usually from about two hours to about five hours. It will be recognized, however, that the actual time involved will depend upon the temperature and pressure employed, the quantity of volatile components present, the volatilization temperature of such volatile components, the quantity of material being devolatilized, and the like.

Following the devolatilization operation, the resulting mixture is calcined to form the substantially crystalline calcium sodium metaphosphate. The calcination is usually conducted in air at essentially atmospheric pressure [1 atmosphere (atm), $1.013 \times 10^5$ pascals (Pa)] and a temperature in excess of the devolatilization temperature but less than the melting point of substantially crystalline calcium sodium metaphosphate, for example, about 720° C. In general, a temperature from about 250° C. to about 450° C., preferably from about 380° C. to about 20° C., most preferably at about 400° C. is sufficient. The time to complete the calcination can be anything up to about 24 hours, but for most purposes, the calcination need take only a nominal period of time up to about 18 hours, usually from about two hours to about 12 hours.

In a preferred embodiment, the dry mix mixture advantageously is devolatilized and calcined in a one-step operation. Such one-step devolatilization/calcination operation is readily accomplished by heating the dry mix mixture at the previously noted temperature from about 250° C. up to a temperature less than the melting point of substantially crystalline calcium sodium metaphosphate, for example, about 720° C., preferably from about 380° C. to about 420° C., most preferably at about 400° C.

The following specific example illustrating the best presently-known method of practicing this invention is described in detail in order to facilitate a clearer understanding of the invention. It should be understood, however, that the detailed expositions of the application of the invention, while indicating preferred embodiments, are given by way of illustration only and are not to be construed as limiting the invention since various changes and modifications within the spirit of the invention will become apparent to those skilled in the art from this detailed description.

EXAMPLE 1

Sodium dihydrogen phosphate ($NaH_2PO_4$, 4852.0 g, 40.4 moles) was charged to a jacketed ribbon blender and delumped by blending at the maximum blending rate for 10 minutes. The blender speed was then reduced to a moderate rate and 7831.0 g (33.5 moles) of calcium phosphate [$Ca(H_2PO_4)_2$] was charged to the blending $NaH_2pO_2$ over a 10-minute period. Cooling water was introduced into the jacket of the ribbon blender at a rate sufficient to maintain the blending $NaH_2PO_4$—$Ca_{(H2}PO_4)_2$ mix at a temperature of 30° C. or less and the mix blended at the maximum blending rate for 30 minutes to intimately mix the $NaH_2PO_4$ and the $CA(H_2PO_4)_2$. Orthophosphoric acid ($H_3PO_4$, 85%, 916.0 g, 7.9 moles) was sprayed over a 30-minute period onto the surface of the $NaH_2PO_4$—$Ca(H_2PO_4)_2$ mix, with continued blending at the maximum rate, via a spray tube positioned just above the surface of the $NaH_2PO_4$—$Ca(H_2PO_4)$ mix using nitrogen as the carrier gas. Upon completion of the addition of the orthophosphoric acid, blending at the maximum rate was continued for an additional 30 minutes. The resulting blended mix, containing 75.7% by weight solids and a mol percent composition on a dry basis of 32.5 mol percent CaO, 16.9 mol percent $Na_2O$, and 50.6 mol percent $P_2O_5$, was placed in an evaporating dish and heated at 400° C. for two hours.

The degree of crystallinity of the resulting substantially crystalline calcium sodium metaphosphate was calculated as follows:

(a) Density - Equation (1)

$d_{sc} = 2.76$
$d_{Oc} = 2.59$
$d_{100c} = 2.84$
$DC = [(2.76 - 2.59)/(2.84 - 2.59)] \times 100$
$= (0.17/0.25) \times 100$
$= 68.0\%$ (b) Differential Thermal Analysis (DTA) - Equation (2)

$pa_{sc} = 63.43$
$m_{sc} = 204.39$
$pa_{100c} = 98.55$
$m_{100c} = 200.08$
$DC = [(63.43/204.39)/(98.55/200.08)] \times 100$
$= (0.31/0.49) \times 100$
$= 63.3\%$

EXAMPLE 2

To a stainless steel jacketed conical vacuum dryer with a stainless steel orbital screw mixer was charged 175.08 kg (1459.1 moles) of powdered sodium dihydrogen phosphate ($NaH_2PO_4$) and mixing was initiated. Powdered calcium phosphate [$Ca(H_2PO_4)_2$] 317.51 kg (1356.9 moles) was added to the $NaH_2PO_4$ and mixing continued for an additional 15 minutes. Orthophosphoric acid ($H_3PO_4$, 85%, 16.76 kg, 145.4 moles) was sprayed onto the surface of the $NaH_2PO_4$—$Ca(HPO_4)_2$ mix, with continued mixing, over a period of 12 minutes. After completion of the $H_3PO_4$ addition, the vacuum dryer was sealed and evacuated to approximately $9.82 \times 10^4$ pascals (Pa). The vacuum dryer was then heated with oil in the dryer jacket to 260° C. The dry mix was mixed and heated in this manner for 6.67 hours. At the end of this period, preheated air having a temperature ranging from 66° C. to 260° C. was introduced into the bottom of the mixer to fluidize the dry mix over a period of 10.33 hours. During this time period, the pressure in the vacuum mixer ranged from $6.77 \times 10^4$ Pa to $9.48 \times 10^4$ Pa. The heated mix was allowed to cool to ambient temperatures, the fluidizing air was turned off, and the pressure was allowed to return to atmospheric pressure. The resulting product, characterized by a flowable powder consistency, had a mol percent composition on a dry basis of 32.2 mol percent CaO, 17.1 mol percent $Na_2O$, and 50.7 mol percent $P_2O_5$ and a degree of crystallinity of 68% as determined by density measurements and 63% as determined by DTA measurements.

Thus, it is apparent that there has been provided, in accordance with the instant invention, a process for the preparation of substantially crystalline calcium sodium metaphosphate that fully satisfy the objects and advantages set forth hereinabove. While the invention has been described with respect to various specific examples and embodiments thereof, it is understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A process for the preparation of substantially crystalline calcium sodium metaphosphate having a degree of crystallinity from about 60% to about 75% as determined from density and differential thermal analysis measurements, which process comprises:

(a) forming a dry mix mixture of source materials for CaO, $Na_2O$, and $P_2O_5$ in proportion sufficient to provide a CaO/$Na_2O$/$P_2O_5$ mol percent ratio on a dry basis of about 29.0–34.0/16.0–18.0/50.0–53.0, and (b) heating the mixture from step (a) at a temperature and for a time sufficient to volatilize and remove volatile components and calcine the resulting mixture to form the substantially crystalline calcium sodium metaphosphate.

2. The process of claim 1 wherein the source material for each of CaO, $Na_2O$, and $P_2O_5$, respectively, is a calcium phosphate, a sodium orthophosphate, and a phosphoric acid.

3. The process of claim 2 wherein the calcium phosphate is $Ca(H_2PO_4)_2$, the sodium orthophosphate is $NaH_2PO_4$ and the phosphoric acid is 85% $H_3PO_4$.

4. The process of claim 1 wherein the CaO/$Na_2O$/$P_2O_5$ mol percent ratio is about 31.4–31.8/17.1–17.3/51.1–51.3.

5. The process of claim 1 wherein the heating of the mixture in step (b) is effected at a temperature from about 60° C. to about 720° C.

6. The process of claim 1 wherein the mixture is heated in step (b) at an initial temperature from about 60° C. to about 200° C. to volatilize and remove volatile component(s), followed by heating at a subsequent temperature from about 250° C. to about 720° C. to calcine the resulting mixture.

7. The process of claim 1 wherein the heating in step (b) effects devolatilization and calcination of the mixture in one step.

8. The process of claim 7 wherein the one-step devolatilization/calcination operation is effected at a temperature from about 250° C. to about 720° C.

9. The process of claim 8 wherein the temperature is from about 380° C. to abou 420° C.

10. The process of claim 1 wherein the heating of the mixture in step (b) is carried out for a nominal period of time up to about eighteen hours.

11. The process of claim 1 wherein the substantially crystalline calcium sodium metaphosphate is characterized by a degree of crystallinity of about 60% to about 70%.

12. The process of claim 11 wherein the degree of crystallinity is between about 63% and about 68%.

* * * * *